(12) United States Patent
Reimann et al.

(10) Patent No.: US 8,788,152 B2
(45) Date of Patent: Jul. 22, 2014

(54) METHOD AND DEVICE FOR ACTUATING A DOOR OR A FLAP OF A VEHICLE

(75) Inventors: Martin Reimann, Hamm (DE); Ludger Weghaus, Lippstadt (DE); Ruben Maier, Ingolstadt (DE); Andreas Thiele, Wolfsburg (DE); Bernd Ette, Wolfsburg (DE)

(73) Assignees: Volkswagen AG, Wolfsburg (DE); Audi AG, Ingolstadt (DE); Hella KGaA Hueck & Co., Lippstadt (DE)

( * ) Notice: Subject to any disclaimer, the term of this patent is extended or adjusted under 35 U.S.C. 154(b) by 288 days.

(21) Appl. No.: 12/990,288

(22) PCT Filed: Apr. 14, 2009

(86) PCT No.: PCT/EP2009/002731
§ 371 (c)(1),
(2), (4) Date: Jan. 12, 2011

(87) PCT Pub. No.: WO2009/132766
PCT Pub. Date: Nov. 5, 2009

(65) Prior Publication Data
US 2011/0118946 A1    May 19, 2011

(30) Foreign Application Priority Data
Apr. 29, 2008   (DE) .......................... 10 2008 021 324

(51) Int. Cl.
*G06F 7/00* (2006.01)
*E05F 15/20* (2006.01)

(52) U.S. Cl.
CPC .. *G06F 7/00* (2013.01); *E05F 15/20* (2013.01)
USPC ................. 701/49; 49/25; 49/506; 296/146.4

(58) Field of Classification Search
USPC .............. 701/49; 340/5.72; 296/146.4; 49/25
See application file for complete search history.

(56) References Cited

U.S. PATENT DOCUMENTS

| 4,763,121 | A | * | 8/1988 | Tomoda et al. ............. 340/5.61 |
| 5,929,769 | A | * | 7/1999 | Garnault ...................... 340/5.61 |
| 6,476,517 | B1 | * | 11/2002 | Okada .......................... 307/10.2 |
| 6,522,027 | B1 | * | 2/2003 | Morillon et al. ............. 307/10.3 |

(Continued)

FOREIGN PATENT DOCUMENTS

| DE | 10038803 A1 | 2/2002 | ............. B60R 25/00 |
| DE | 10106400 A1 | 8/2002 | ............... G07C 9/00 |

(Continued)

OTHER PUBLICATIONS

German Office Action, German Patent Application No. 10 2009 017 404.4, 4 pages, Jul. 11, 2012.

(Continued)

*Primary Examiner* — Thomas Tarcza
*Assistant Examiner* — Tyler J Lee
(74) *Attorney, Agent, or Firm* — King & Spalding L.L.P.

(57) ABSTRACT

In a method and a device (12) for actuating a door or flap (1) of a vehicle (10), the door or flap (1), if it is closed, is automatically opened or, if it is open, is automatically closed if a movement of an object with at least one change in direction is detected outside the vehicle (10) and at the same time a key (6) assigned to the vehicle (10) is detected.

24 Claims, 3 Drawing Sheets

(56) References Cited

U.S. PATENT DOCUMENTS

| | | | |
|---|---|---|---|
| 6,577,226 B1 * | 6/2003 | Steiner | 340/5.62 |
| 6,825,752 B2 * | 11/2004 | Nahata et al. | 340/5.64 |
| 8,091,280 B2 * | 1/2012 | Hanzel et al. | 49/25 |
| 8,217,755 B2 * | 7/2012 | Martin et al. | 340/5.72 |
| 8,228,166 B2 * | 7/2012 | Eberhard | 340/5.72 |
| 8,237,544 B2 * | 8/2012 | Nakashima | 340/5.72 |
| 2005/0168322 A1 | 8/2005 | Appenrodt et al. | 340/572 |
| 2008/0068145 A1 | 3/2008 | Weghaus et al. | 340/426.25 |

FOREIGN PATENT DOCUMENTS

| | | | | |
|---|---|---|---|---|
| DE | 10361115 A1 | 7/2005 | | B60R 25/00 |
| DE | 102005034097 A1 | 8/2006 | | B60R 25/24 |
| DE | 102005031186 A1 | 1/2007 | | B60R 25/24 |
| DE | 102005042402 A1 | 3/2007 | | B50J 5/04 |
| DE | 102006001506 A1 | 9/2007 | | H03K 17/955 |
| DE | 102006037237 A1 | 2/2008 | | B60R 25/20 |
| DE | 102006044112 A1 | 3/2008 | | B60R 25/00 |
| EP | 0770749 A2 | 5/1997 | | B60R 25/00 |
| EP | 1733937 A1 | 12/2006 | | B60R 25/00 |
| EP | 1902912 A1 | 3/2008 | | B60R 25/00 |
| WO | 01/81694 A1 | 11/2001 | | E05B 49/00 |

OTHER PUBLICATIONS

International PCT Search Report, PCT/EP2009/002731, 11 pages, Aug. 25, 2009.

European Office Action, EP Patent Application No. 09 737 810.3, 5 pages, Apr. 19, 2011.

* cited by examiner

METHOD AND DEVICE FOR ACTUATING A DOOR OR A FLAP OF A VEHICLE

CROSS-REFERENCE TO RELATED APPLICATIONS

This application is a U.S. National Stage Application of International Application No. PCT/EP2009/002731 filed Apr. 14, 2009, which designates the United States of America, and claims priority to German Application No. 10 2008 021 324.1 filed Apr. 29, 2008, the contents of which are hereby incorporated by reference in their entirety.

TECHNICAL FIELD

The present invention relates to a method and a device to actuate a door or a flap, in particular a rear flap, of a vehicle in a contactless manner.

BACKGROUND

DE 10 2004 041 709 B3 discloses a vehicle comprising a flap which is opening automatically due to an opening instruction, wherein the opening instruction is carried out without a manual actuation of a release/locking mechanism.

DE 10 2006 015 930 A1 discloses a method for automatically opening an element of a motor vehicle. In this case, the element is opened when a portable code transmitter carries out at least one pre-definable change of position, thereby authorizing for automatically opening the element.

DE 103 61 115 A1 describes a method for remotely controlling doors and/or flaps of vehicles, in which an approach towards the vehicle and/or the position of a corresponding authentication element is detected. The communication for opening a door and/or a flap is enabled by means of a predefined manual operating activity prior to the approach towards the vehicle and/or by means of a predefined course of movement after arriving at the vehicle.

DE 10 2006 037 237 A1 relates to a method for controlling a door of a vehicle. In this case, a movement pattern of the mobile identification transmitter relative to the vehicle is detected via a movement detection device located in the vehicle. The door is opened, when a predetermined movement pattern of the authenticated mobile identification transmitter has been detected.

In most vehicles in operation today, it is virtually impossible to open a door or a flap of a vehicle without the help of at least one hand. This is disadvantageous especially in a case where no free hand is available, for example because both hands are required to carry a load.

SUMMARY

According to various embodiments, a method and a device can be provided by means of which a door or a flap of a vehicle may be actuated in a contactless manner. In addition, the various embodiments may take a faulty activation into consideration, i.e. an unintended opening or closing, preferably has to be avoided.

According to an embodiment, in a method for actuating a door or a flap of a vehicle, the door or flap, if it is closed, is opened automatically or the door or flap, if it is open, is closed automatically, when movement of an object comprising at least one change in direction is detected outside the vehicle, and at the same time a key assigned to the vehicle is detected.

According to a further embodiment, the movement can be detected, when a first movement of the object and subsequently within a predefined period of time a second movement of the object is detected, wherein the first movement and the second movement substantially are opposite to each other. According to a further embodiment, the door or flap can be opened or closed automatically only then, when the key is detected after the forward movement and before the reverse movement. According to a further embodiment, after the forward movement an optical and/or an acoustical indication may be output, when the key is detected. According to a further embodiment, the door or flap can be opened or closed automatically only then, when the key is detected after the forward and reverse movement. According to a further embodiment, the door or flap can be opened or closed automatically only then, when a field strength, which is generated inside the vehicle by a signal transmitted by the key, has dropped below a predefined threshold value within a predefined period of time after the detection of the movement.

According to another embodiment, a device for actuating a door or a flap of a vehicle, may comprises a mechanism for actuating the door or flap, at least two sensor devices spaced from each other, each comprising at least one sensor, and control means, the control means being designed such, that the control means by means of the mechanism open the door or flap, if it is closed, or close it, if it is open, when a movement of an object comprising at least one change in direction is detected outside the vehicle via the two sensor devices, and at the same time the control means detect a key assigned to the vehicle.

According to a further embodiment of the device, from the at least two sensor devices at least one may have an oblong form, and from the at least two sensor devices at least two sensor devices can be arranged substantially parallel to each other. According to a further embodiment of the device, the control means may comprise a first sensor evaluation unit and at least a second sensor evaluation unit, the first sensor evaluation unit is connected electrically to one sensor of the at least two sensors, each of the at least one second sensor evaluation unit is connected electrically to one sensor of the other of the at least two sensors, each of the at least one second sensor evaluation unit is connected electrically to the first sensor evaluation unit, and the first sensor evaluation unit has a master function and the at least one second sensor evaluation unit has a slave function. According to a further embodiment of the device, the control means may comprise a first sensor evaluation unit and a second sensor evaluation unit, the first sensor evaluation unit is connected electrically to one sensor device of the two sensor devices, the second sensor evaluation unit is connected electrically to the other sensor device of the two sensor devices, the first sensor evaluation unit and the second sensor evaluation unit are connected electrically to each other, and the first sensor evaluation unit and the second sensor evaluation unit each have a master function having equal rights. According to a further embodiment of the device, the control means may comprise at least one control unit, which comprises an evaluation function for evaluating the at least two sensors, and a control function for controlling the mechanism, and each sensor evaluation unit, that has a master function, is connected electrically to the at least one control unit.

According to yet another embodiment, a vehicle may comprise a device as described above.

According to a further embodiment of the vehicle, the at least two sensor devices may substantially extend in the direction of the width of the vehicle centered at the rear end section of the vehicle, and the at least two sensor devices may be aligned substantially parallel to a road surface and pointing towards the road surface. According to a further embodiment of the vehicle, one of the at least two sensor devices may run in a longitudinal direction of the vehicle in front of an opening for a towing hitch of the vehicle, and a further of the at least two sensor devices runs in a longitudinal direction behind the opening for the towing hitch. According to a further embodiment of the vehicle, the at least two sensor devices may be integrated into a component of the vehicle mounted to the rear end of the vehicle and substantially consisting of plastic material, such that the at least two sensor devices are embedded in the plastic material such that they are completely protected against an outside area by the plastic material. According to a further embodiment of the vehicle, the at least two sensors for actuating the flap can be arranged at a bumper of the vehicle and/or at a spoiler of the vehicle and/or at a diffuser of the vehicle and/or below a rear end of the body of the vehicle. According to a further embodiment of the vehicle, the at least two sensors for actuating the door can be arranged at a side skirt of the vehicle and/or below a side of the body of the vehicle.

BRIEF DESCRIPTION OF THE DRAWINGS

The present invention is described in the following in detail with the help of embodiments and with respect to the drawings.

Schematically illustrated in FIG. 1 is a vehicle according to various embodiments, which comprises a device according to various embodiments.

Illustrated in FIG. 2 are two sensor devices according to various embodiments, which are formed in a rear end diffuser of a vehicle.

Illustrated in FIGS. 3a-3d are differing arrangements according to various embodiments of two sensor surface areas at a rear end bumper.

DETAILED DESCRIPTION

According to an embodiment, a method for actuating a door or a flap, in particular a rear flap, of a vehicle is provided, whereby the door or flap, if it is closed at that moment (wherein it is irrelevant, whether the vehicle is unlocked or locked), is opened automatically or whereby the door or flap, if it is open at that moment, is closed automatically. The method only actuates the door or flap when a movement of an object outside the vehicle is detected and when this movement has at least one change in direction and when in addition at the same time a key assigned to the vehicle is detected, in particular in an area near the door or the flap. In particular, comprehended as a key assigned to the vehicle in this case is a key by which the vehicle may be unlocked and started. For example, this may be a key or a radio chip for keyless entry system of the vehicle.

If, for example, the object is a foot, a driver of the vehicle can open or close the door or flap of the vehicle even when he/she has no free hand, by carrying out the respective movement using his/her foot, i.e. a foot gesture, provided that the vehicle at the same time detects the key assigned to it, for example, due to the driver transporting this key. Thereby, an entry into the vehicle during loading and unloading is simplified and facilitated.

Since the vehicle only then is closed or opened automatically when the detected movement has at least one predefined change in direction, an operating error, for example by a cat or a ball, which as a general rule move uniformly, thus without a change in direction, furthermore is substantially avoided. In particular, comprehended as a movement comprising at least one change in direction in this case is a movement, in which the object sequently moves in at least two directions during the movement, wherein a direction vector of the one direction has at least an angle of 90° relative to a direction vector of another direction.

The movement of the object comprising at least one change in direction may for example then be existent, when the object carries out a forward movement or a first movement, respectively, and subsequently a reverse movement or a second movement, respectively, within a predefined period of time, wherein the forward movement is a movement substantially directed against the reverse movement. However, also when the second movement quasi is carried out in a right angle (or a larger angle) with respect to the first movement, a movement comprising at least one change in direction in the sense of the present invention is existent.

In this case, the door or flap in particular is automatically opened or automatically closed only then, when the key is detected after the forward movement and before the reverse movement.

In other words, after the movement has been detected a key is searched for, for example by means of a keyless entry system of the vehicle.

In doing so, if no key is found within a predefined period of time, the door or the flap is not activated, even in the case a reverse movement takes place.

However, it is also possible that the door or flap is opened automatically or closed automatically only then, when the key is detected after the forward and reverse movement. In this embodiment as well, only after the reverse movement a key is searched for, for example by a keyless entry system of the vehicle. As in the other embodiment, the door or the flap is not activated, when in doing so no key is found in a predefined period of time. Compared to the previous embodiment, in which the key is searched for already before the reverse movement, this embodiment has the advantage of a lower energy consumption, since an authentication action (i.e. searching for the key) is carried out only after the complete detection of the movement (forward as well as reverse movement have been detected).

For example, for an orientation of an operator, after the detection of the forward movement or after the detection of the reverse movement, respectively (depending on which of the previously described embodiments are employed), an optical and/or an acoustical indication may be output when the key has been detected.

By means of this optical and/or acoustical indication, it is signalized to the operator, for example the driver of the vehicle, that the forward movement or the forward and the reverse movement, respectively, have been detected successfully. In the above described embodiment, in which the key already is searched for after the forward movement, in doing so the operator is signalized, that he/she, for example by retracting the foot, may initiate an actuation of the door or flap. This action advantageously reduces the possibility of faulty activations significantly. If the foot is not retracted within a predefined period, the method according to various embodiments returns to an initial state and again awaits a forward movement.

In an embodiment, the door or flap is opened or closed automatically only then, when a field strength, which is generated in the vehicle by means of a signal transmitted by the key, has dropped below a predefined threshold value within a predefined period after the detection of the movement. In particular, in doing so, the key has to be detected by the vehicle during the entire operation (opening operation or closing operation) (i.e. the field strength has to be above a detection threshold), since otherwise the activity is aborted.

Since the field strength generated in the vehicle by the key decreases, when the key and therefore the driver, who normally carries the key, moves away from the vehicle, the door or the flap only then is opened or closed, respectively, when the driver advantageously is not anymore located in an area around the door or the flap. This course of action advantageously significantly reduces a risk of jolting (during an automatic opening) or a risk of pinching (during an automatic closing), respectively, in the range of the opening or closing door or flap, respectively.

Furthermore, it is possible that during the closing activity of the door or flap optical and/or acoustic signals, for example a courtesy lamp and/or a brake light or an audio warning output via loudspeakers are activated, for example cyclical, in order to also caution uninvolved persons, for example pedestrians, about the opening or closing door or flap.

According to an embodiment, also a device for actuating a door or flap of a vehicle is provided. In this case, the device comprises a mechanism for actuating, i.e. for opening or closing, the door or flap, at least two sensor devices spaced from each other, each comprising at least one sensor and control means. In doing so, the control means are designed such, that the control means, via the mechanism, opens the door or flap, if it is closed, or closes it, if it is open, when a movement of an object comprising at least one change in direction is detected outside the vehicle via the at least two sensor devices and when at the same time the control means detect a key assigned to the vehicle.

The advantages of the device substantially correspond to the advantages of the method, which in advance have been described in detail, for which reason a repetition is set aside here.

According to an embodiment at least one of the at least two sensor devices has an oblong form. Furthermore, at least two of the sensor devices are arranged substantially parallel to each other. Thus, according to an embodiment, a device may comprise two sensor devices, each of which have an oblong form and are arranged substantially parallel to each other.

In this case, at least one of the sensor devices in particular has an elongation of 50 cm to 120 cm. A separation distance between two of the sensor devices may be at least 5 cm and a maximum of 25 cm. A separation distance between each of the at least two sensor devices and the road surface thereby in particular is in a range of 20 cm to 60 cm. Thus, according to a further embodiment, a device may have two in particular oblong sensor devices, each having an elongation of 50 cm to 120 cm. A separation distance between these two sensor devices running substantially parallel to each other thereby is at least 5 cm and a maximum of 25 cm.

As described in advance, each sensor device comprises a sensor. The type of this sensor may be an ultrasound sensor, a high frequency sensor, an optical sensor, a thermal sensor or a capacitive sensor. According to various embodiments, it is also possible in this case, that at least one of the sensor devices comprises more than one sensor. In doing so, a sensor device that comprises several sensors may comprise sensors of the same type but also sensors of different types.

According to an embodiment, at least one of the sensor devices comprises a capacitive sensor, which is designed in the form of a conductor-like electrode having a length of at least 50 cm. In a further embodiment, two of the sensor devices each comprise a capacitive sensor, wherein these capacitive sensors are designed in the form of a conductor-like electrode having a length of at least 50 cm. It is to be mentioned explicitly, that two or more sensor devices spaced from each other, each comprising at least one sensor, according to various embodiments by certain experts may be understood to be a single sensor, which has two or more respective electrodes spaced from each other.

It is to be mentioned, that in line with the present invention a sensor also is understood to be a sensor surface area. The device according to various embodiments may therefore comprise at least two sensor surface areas, which form the at least two sensor devices spaced from each other, so that each sensor device has at least one sensor surface area.

According to an embodiment the control means comprise a sensor evaluation unit, which is connected to each sensor electrically, so that the sensor evaluation unit detects the movement of an object comprising at least one change in direction by means of the sensors and correspondingly activates the mechanism for operating the door or flap.

However, according to various embodiments it is also possible, that the control means comprise an independent sensor evaluation unit for each sensor surface area, so that each sensor surface area is electrically connected with an individual sensor evaluation unit. These sensor evaluation units again are connected to each other electrically, wherein they form either a master-slave system or a multi-master system. In a master-slave system, one sensor evaluation unit adopts the master function and the other sensor evaluation units only have a slave function. In this case, the evaluation functions for detecting the movement of an object comprising at least one change in direction, and the control functions for controlling the mechanism for operating the door or flap, each only are implemented by the one or the several sensor evaluation units provided with a master function, while accordingly the sensor evaluation units provided with a slave function only pass the signals received by their respective sensor surface area to the sensor evaluation unit comprising a master function.

Comparing an arrangement of sensor evaluation units according to a master-slave system with an arrangement of sensor evaluation units according to a multi-master system, the multi-master system has the advantage, that all sensor evaluation units are constructed in the same manner, so that, for example, a mix-up during the assembly of the device according to various embodiments is not possible.

However, according to various embodiments it is also possible, that at least a part of the evaluation and control functions are implemented in one or in several control units within the vehicle. The advantage is that control units already existent in the vehicle may be used for the evaluation of the sensor surface areas and for the control of the mechanism for operating the door or flap, so that advantageously no dedicated control unit has to be used or installed for the device according to various embodiments. When using one or more control units, the function of the sensor evaluation units is reduced to transfer the signals received form the sensor surface areas to the at least one control unit, possibly conditioned accordingly. If the sensor evaluation units are implemented in a master-slave system, the sensor evaluation units comprising the slave function transfer the signals received from their sensor surface areas to the sensor evaluation unit comprising the master function and that then transfers the signals, possibly conditioned accordingly, to the at least one control unit.

According to another embodiment, a vehicle may comprise a device as described above.

In this case, the at least two sensor devices substantially extend centered in the direction of the width of the vehicle at the rear end section of the vehicle. In doing so, the at least two sensor devices substantially are aligned parallel to a road surface and are aligned pointing towards the road surface.

Therefore, the device according to various embodiments is actuated, when an object, for example the foot of the driver, is directed under the vehicle above the road surface at the rear end section and comprising at least one change in direction, provided that in doing so the respective key is detected. As the at least two sensor devices according to various embodiments are arranged across a relatively wide area substantially centered at the rear end section of the vehicle, advantageously an intuitive operation in the center of the vehicle is ensured.

In this case, in particular a first one of the sensor devices is arranged in the longitudinal direction of the vehicle in front of an opening for a towing hitch of the vehicle and a second one of the sensor devices is arranged in the longitudinal direction behind this opening for the towing hitch.

In doing so, the sensor devices in particular are integral with a vehicle component mounted at the rear end of the vehicle substantially consisting of plastic material such, that the sensor devices are embedded in the plastic material of the vehicle component such, that they are completely covered against an outside area by the plastic material. However, it is also possible that the sensor devices are mounted in the inside at the rear end diffuser, for example by means of brackets. In doing so, the sensor devices, superiorly their electrodes, may be formed as being flexible, stiff or partially flexible and partially stiff. In this case, an electrode formed as being partially stiff and partially flexible is understood to be an electrode, in which certain sections are formed as being stiff (therefore only to be bent with difficulty) and other sections are formed as being flexible (therefore easily to be bent).

When the sensor devices are covered completely against an outside area by the plastic material, they are advantageously protected against dirt and wet conditions and can hardly be noticed from the outside.

In doing so, the at least two sensor surface areas may be mounted for actuating a rear flap as follows:
  at the bumper of the vehicle or
  at the spoiler of the vehicle or
  at the diffuser of the vehicle or
  below the rear end of the vehicle body (for example below the trunk or the cargo area floor or the spare tire recess of the vehicle).

Of course, it is also possible, that the sensor surface areas are installed in a distributed manner onto the bumper/spoiler/diffuser and below the rear end of the vehicle body.

In order to actuate a side door the at least two sensor surface areas may be mounted as follows:
  at a side skirt or at a flare of the vehicle or
  below the side of the vehicle body In this case, it is also possible, that the sensor surface areas are installed onto side skirt/flare and below the side of the vehicle body in a distributed manner.

The various embodiments in particular are suitable for actuating a door or flap, for example a rear flap, of a vehicle. Of course, the present invention is not limited to this preferred area of application, but as well may be used to actuate a window or a sunroof of the vehicle, for example. Furthermore, the present invention also may be applied to aircraft, ships or railmounted vehicles.

Figure 1:
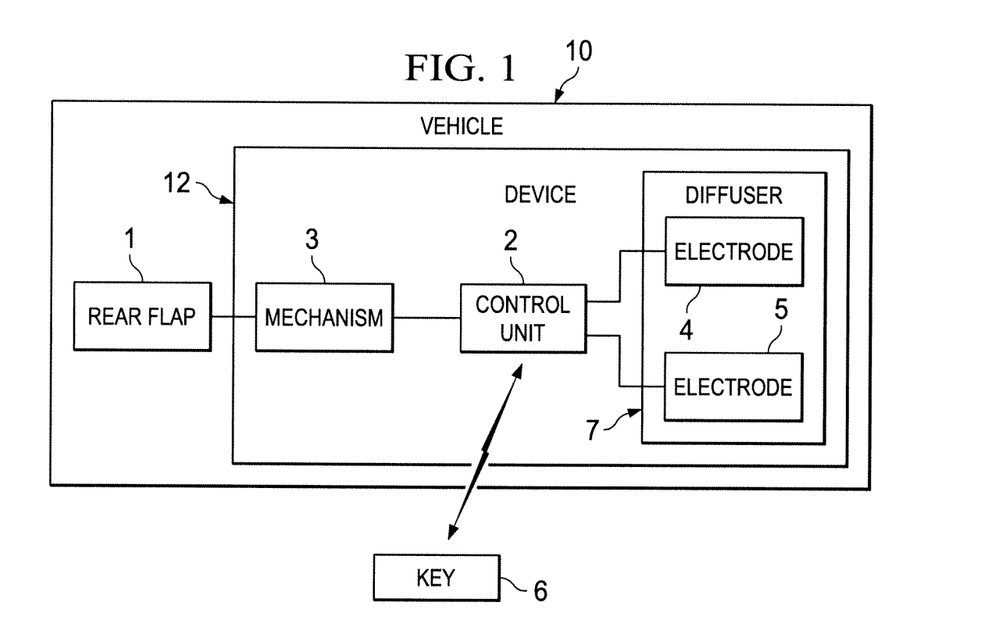

A vehicle 10 according to various embodiments shown in FIG. 1 comprises a device 12 according to various embodiments, by means of which a rear flap 1 of the vehicle 10 may be opened automatically. In this case, the device 12 according to various embodiments comprises a mechanism 3 for opening and closing the rear flap 1, a control unit 2, which activates the mechanism 3 and is connected to a first capacitive sensor electrode 4 and to a second capacitive sensor electrode 5, both of which are integrated into a rear end diffuser 7 or a rear end bumper of the vehicle 10.

In this case, the control unit 2 is designed such, that it detects a predefined movement of an object in the central region of the vehicle 10 under the rear end diffuser 7 by means of a sensor control unit 11 (see FIG. 2) and the two sensor electrodes 4, 5 (is described in more detail together with FIG. 2) and activates the mechanism 3 accordingly, when the control unit 2 at the same time detects a key 6, in order to open or to close the rear flap 1 via the mechanism 3.

Figure 2:
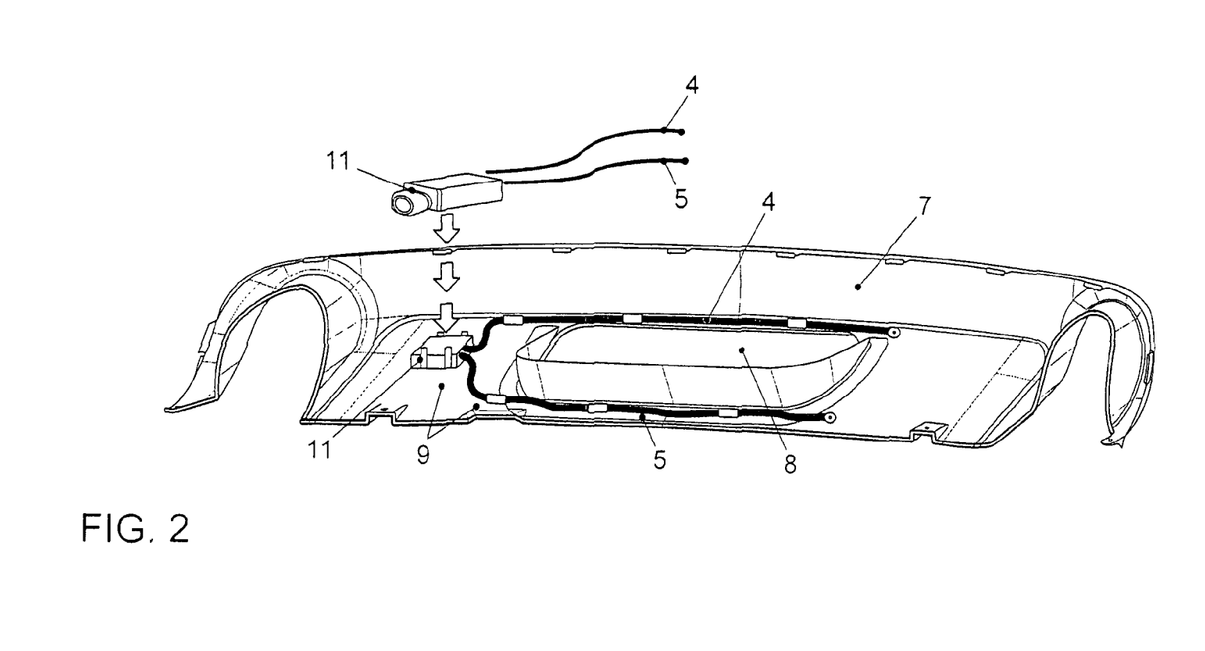

Depicted in FIG. 2 are a first capacitive sensor electrode 4 and a second capacitive sensor electrode 5, which are formed in the rear end diffuser 7 of a vehicle and as well are known as satellite lines. In this case, the first capacitive sensor electrode 4 extends in driving direction behind an opening 8 for a towing hitch of the vehicle and the second capacitive sensor electrode 5 extends in driving direction in front of this opening 8 for the towing hitch, wherein both capacitive sensor electrodes 4, 5 extend alongside this opening in the direction of the width of the vehicle as well. The rear end diffuser or the spoiler, respectively, thereby is depicted in FIG. 2 as comprising a detachable cover casing for the towing hitch within the opening 8. In this case the two electrodes 4, 5 are integrated into the rear end diffuser 7 in particular such, that they completely are surrounded by a carbon fiber reinforced plastic material, from which the rear end diffuser is formed, so that on the one hand they are protected against dirt, wet conditions and damage and on the other hand are not visible.

By means of the first capacitive sensor electrode 4 as well as by means of the second capacitive sensor electrode 5 a capacity between the respective electrode 4, 5 and the road surface is measured. In the case this capacity is changing, for example when an object is positioned between the respective electrode 4, 5 and the road surface, this change of capacity is detected for the respective electrode 4, 5 by means of the sensor control unit 11, in which the two electrodes 4, 5 converge. This sensor control unit 11 has a connection to the electrical system of the vehicle 10 and therefore to the control unit 2 as well, whereby results detected by means of the electrodes 4, 5 as well are registered to the control unit 2.

Due to the distance of the two electrodes 4, 5 a movement analysis may be carried out, for example of a foot, which is moving between the rear end diffuser 7 and the road surface. In case a towing hitch is mounted, in this embodiment the function may activate the automatic actuation of a rear flap, in case the driver moves his foot forward and back to the left or to the right of the towing hitch under the vehicle 10, thus carrying out a type of pendulum motion using the foot. When the towing hitch is not mounted, an intuitive operation is possible in the center of the vehicle as the driver moves his foot forward and back in the center behind the vehicle 10 and under the vehicle 10 or carries out the pendulum motion here, respectively. Therefore, it is possible by way of the electrodes 4, 5 installed in parallel to carry out a simple tipping movement for opening or closing the rear flap without a complex operation sequence being required from the driver.

Due to the two electrodes 4, 5 installed in parallel, the two electrodes 4, 5 form a capacitive sensor array, whereby the operation activity may be divided into two movements, each comprising a different direction. In the first movement (forward movement) the foot moves under the rear end diffuser 7 and in the second movement (reverse movement), the foot is retracted by the operator. When the device 12 according to various embodiments (see FIG. 2) detects the forward movement via the capacitive sensor electrodes 4, 5, at first the first capacitive sensor electrode 4 and subsequently the second capacitive sensor electrode 5 is activated, then the device 12 according to various embodiments by means of the control unit 2 searches for a key or radio chip 6 assigned to the vehicle 10, using a radio signal being transmitted by an antenna, in particular at the rear end section of the vehicle 10. If the key 6 is located within the reception range of the antenna, it transmits a radio signal itself, which ultimately is detected by the control unit 2. In this case (control unit 2 detects a respective radio signal from key 6), the device 12 according to various embodiments may give a feedback to the operator via an optical and/or acoustic indication, for example with the help of the third brake light. The operator thus knows that the device 12 has successfully detected the forward movement and may then retract his/her foot, which leads to an opening of the rear flap. Thereby, this reverse movement is detected by the electrodes such, that at first the second electrode 5 and subsequently the first electrode 4 again measure the initial capacity (the capacity measured before the forward movement).

When after a detection of a forward movement no key is detected by the control unit 2, which is assigned to the vehicle 6, the device 12 returns to a state in which it waits for a further forward movement. The device 12 according to various embodiments also takes this state, when the vehicle 10 is locked. If, however, the engine of the vehicle 10 is running or when the speed of the vehicle is above a predefined speed threshold value, the device 12 leaves this state, because then, for reasons of security, it is not possible to open or close the rear flap 1 by the various embodiments. In this case, the speed threshold value in particular is chosen such, that it is detected when the vehicle is moving (thus not is standing still). Depending on the measurement accuracy, this speed threshold value therefore in particular is between 0 and 3 km/h.

In a certain embodiment, the device 12 is designed such, that it leaves the state in which it waits for a forward movement, when the vehicle was not unlocked throughout a long predefined period of time (for example 72 hours), wherein the device 12 then takes a state, in which the rear flap 1 cannot be actuated anymore via the device 12. Using this embodiment it is intended to avoid, that a battery of the vehicle 10 is slowly discharged by the device 12 according to various embodiments, when the vehicle 10 is parked over a long period of time, for example during a vacation.

The closing of the rear flap 1 is carried out analogously to the above described action for opening the rear flap 1 with the difference, that an optical (for example by means of a courtesy lighting of the rear flap 1) and/or an acoustic signal (for example by means of an audio warning via a loudspeaker in the rear area of the vehicle or by means of a buzzer in the rear flap 1) is activated (cyclical) before and/or during the closing action of the rear flap 1. Furthermore, the device 12 closes the rear flap 1 only then, when it is detected via the control unit 2 that within a predefined period of time after the detection of the reverse movement a field strength, which is generated in the vehicle 10 by the radio signal transmitted by the key, has dropped below a predefined threshold value. If this is the case, the device 12 assumes that the driver of the vehicle 10, who normally carries the key, has moved away from the region of the rear flap. By means of this course of action, the risk of pinching in the range of the closing rear flap is reduced significantly, since the operator (provided that he/she is carrying the key) primarily has to step back from the rear flap 1, before the rear flap 1 is closed by the device 12.

Instead of the capacitive sensor electrodes 4, 5, also ultrasound sensors could be utilized in line with the various embodiments. However, for a similarly wide detection range (more than 50 cm) to be detected by the ultrasound sensors, several ultrasound sensors, for example arranged in distances of 5 cm, have to be used instead of a capacitive sensor electrode 4, 5. In other words, the first capacitive sensor electrode 4 for example could be replaced by 11 ultrasound sensors, which would be arranged at the rear end diffuser 7 where the first sensor electrode 4 is located according to the embodiment shown in FIG. 2. In a similar way, the second capacitive sensor electrode 5 could be replaced by further 11 ultrasound sensors, which again would have to be arranged at the rear end diffuser 7 where the second sensor electrode 5 is located according to the embodiment shown in FIG. 2.

Furthermore, it is possible that the first or second sensor device, respectively, which comprises only one sensor electrode 4, 5 according to the embodiment illustrated in FIG. 2, comprises several capacitive sensor electrodes. These several capacitive sensor electrodes could be arranged side by side in the region in which the first and second sensor electrodes 4, 5 extend according to the embodiment illustrated in FIG. 2. The advantage of applying several capacitive sensor electrodes for the first and/or second sensor device is, that the results of one of these several sensor electrodes, which effectively monitor the same region, since they are arranged closely together, could be qualified by one or more other sensor electrodes of the same sensor device, so that a possibility of a faulty activation, but as well a possibility of an activation not being effected, despite a properly effected movement of the foot by the driver, could be further minimized.

Illustrated in FIG. 3 are different arrangements of two sensor surface areas 4, 5 at the rear end bumper or rear end diffuser or rear end spoiler 7.

Figure 3A:
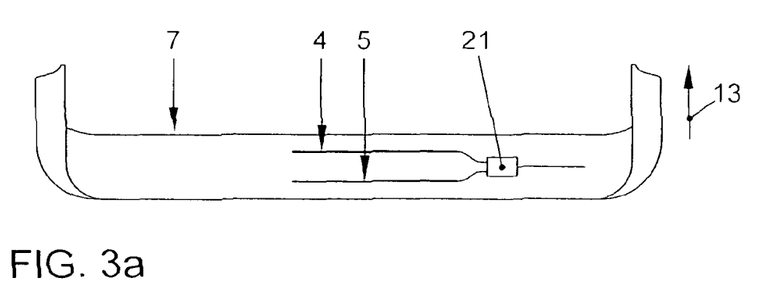

In FIG. 3a the two sensor surface areas 4, 5 are electrically connected to a shared sensor evaluation unit 21. This sensor evaluation unit evaluates the signals detected by the two sensor surface areas 4, 5 to detect a movement of an object comprising at least one change in direction, so that depending thereon and if applicable, by use of a further control unit, which checks whether a key assigned to the vehicle is detected, the mechanism for actuating the door or flap is activated accordingly. In this case, a driving direction is indicated by the reference numeral 13 in FIG. 3.

Figure 3B:
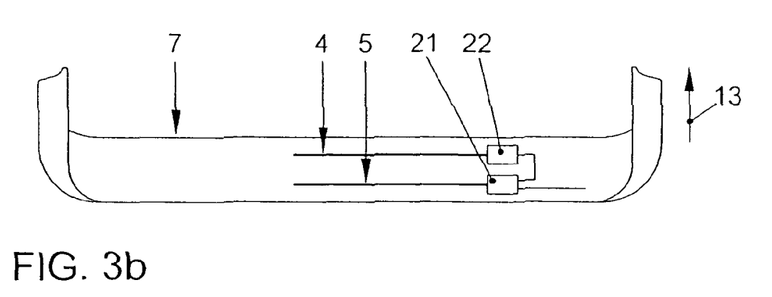

In FIG. 3b the two sensor surface areas 4, 5 each are electrically connected to a dedicated sensor evaluation unit 21, 22. According to a first variant, in doing so, the first sensor evaluation unit 21 has a master function and the second sensor evaluation unit 22 has a slave function. In doing so, the second sensor evaluation unit transfers the signals detected by the first sensor surface area 4 only in a form processible by the first sensor evaluation unit 21 to this first sensor evaluation unit 21. The first sensor evaluation unit 21 accordingly combines the signals received by the second sensor evaluation unit 22 with the signals received by the second sensor surface area 5 in order to decide, if a movement of an object comprising at least one change in direction is existent. Depending on the detected signals of the two sensor surface areas 4, 5 the mechanism for actuating the door or flap then is activated, for example by means of the further control unit.

According to a second variant, both the first sensor evaluation unit 21 and the second sensor evaluation unit 22 each have a master function, so that a multi-master system is implemented. In this case, the two sensor evaluation units 21, 22 evaluate the signals detected by the two sensor surface areas 4, 5 in order to decide, if a movement of an object comprising at least one change in direction is existent, and then to activate the mechanism for actuating the door or flap accordingly, again by means of a further control unit, for example.

Figure 3C:
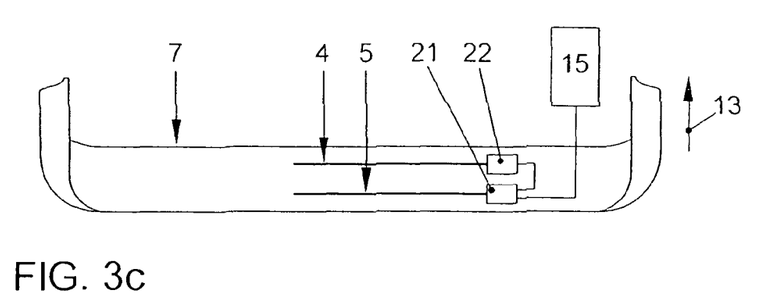

In FIG. 3c the first sensor evaluation unit 21 is connected to a control unit 15, in which a control and evaluation function is implemented, so that the mechanism for actuating the door or flap is activated by the control unit 15, assisted by the further control unit, if applicable.

Figure 3D:
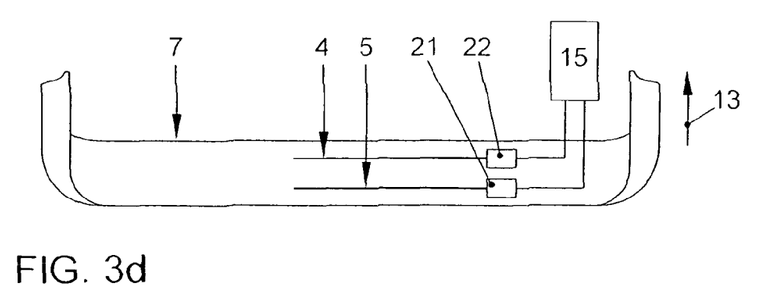

As opposed to the embodiment illustrated in FIG. 3c, in the embodiment illustrated in FIG. 3d each of the two sensor evaluation units 21, 22 is connected electrically directly to the control unit 15.

In doing so, this control unit is a control unit, which also then is existent in the vehicle when the device according to various embodiments for actuating the door or flap is not implemented in the vehicle. In other words, the control unit 15 is a unit, by means of which other functions of the vehicle are monitored or controlled, and which still has free computing capacity to adopt the evaluation and control functions according to various embodiments in addition.

In line with the present invention, there are different possibilities to distribute the evaluation and control functions for evaluating the signals detected by the sensor surface areas 4, 5 and for controlling the mechanism for actuating the door or flap to the sensor evaluation units 21, 22 and the control unit 15. For example, it is possible that the two sensor evaluation units 21, 22 only forward the signals detected by the two sensor surface areas 4, 5 to the control unit, so that the total evaluation and control is implemented in the control unit. Alternatively, according to the invention it is possible, that the two sensor evaluation units 21, 22 already carry out an evaluation of the signals detected by the sensor surface areas 4, 5, and at least prepare an activation of the mechanism for actuating the door or flap, so that merely a small portion of the control function is still implemented within the control unit 15.

REFERENCE NUMERALS 1 rear flap
2 control unit
3 mechanism
4 sensor electrode
5 sensor electrode
6 key
7 rear end diffuser
8 opening for towing hitch
9 mounting point
10 motor vehicle
11 sensor control unit
12 device
13 driving direction
15 control unit
21 sensor evaluation unit
22 sensor evaluation unit

What is claimed is:

1. A method for actuating a door or a flap of a vehicle, comprising:
    detecting a first movement of a person by at least one movement sensor;
    detecting a second movement of the person by the at least one movement sensor;
    analyzing the first and second movements of the person to detect a predefined change in direction between the first and second movements; and
    during a period after the first movement and before the second movement, wirelessly detecting the presence of a key assigned to the vehicle; and
    in response to both (a) detecting the predefined change in direction between the first and second movements of the person and (b) detecting the presence of the key during the period after the first movement and before the second movement, automatically opening or closing the door or flap of the vehicle.

2. The method according to claim 1, comprising automatically opening or closing the door or flap of the vehicle only if the second movement of the person is detected within a predefined period of time after the first movement of the person is detected.

3. The method according to claim 1, wherein the door or flap is opened or closed automatically only if the key is detected after the first movement and before the second movement.

4. The method according to claim 1, wherein:
    the wireless detection of the presence of the key is initiated in response to the detection of the first movement of the person; and
    at least one of an optical and an acoustical indication is output in response to the detection of the key.

5. The method according to claim 2, wherein the door or flap is opened or closed automatically only if the key is detected after the first and second movements of the person.

6. The method according to claim 1, wherein the door or flap is opened or closed automatically only if a field strength, which is generated inside the vehicle by a signal transmitted by the key, has dropped below a predefined threshold value within a predefined period of time after the detection of the second movement of the person.

7. A device for actuating a door or a flap of a vehicle, comprising:
    a mechanism for actuating the door or flap,
    at least two sensor devices spaced from each other, each comprising at least one sensor, and
    a control unit configured to:
        detect a first movement of a person based on signals received from the at least one movement sensor regarding;
        detect a second movement of a person based on signals received from the at least one movement sensor regarding;
        analyze the first and second movements of the person to detect a predefined change in direction between the first and second movements; and
        during a period after the first movement and before the second movement, wirelessly detecting the presence of a key assigned to the vehicle; and
        in response to both (a) detecting the predefined change in direction between the first and second movements of the person and (b) detecting the presence of the key during the period after the first movement and before the second movement, automatically open or close the door or flap of the vehicle.

8. The device according to claim 7, wherein
    at least one of the sensor devices has an oblong form, and
    the at least two sensor devices are arranged substantially parallel to each other.

9. The device according to claim 7, wherein
    the control unit comprises a first sensor evaluation unit and at least a second sensor evaluation unit,
    the first sensor evaluation unit is connected electrically to one sensor of the at least two sensors,
    each of the at least one second sensor evaluation unit is connected electrically to one sensor of the other of the at least two sensors,
    each of the at least one second sensor evaluation unit is connected electrically to the first sensor evaluation unit, and
    the first sensor evaluation unit has a master function and the at least one second sensor evaluation unit has a slave function.

10. The device according to claim 7, wherein
the control unit comprises a first sensor evaluation unit and a second sensor evaluation unit,
the first sensor evaluation unit is connected electrically to one sensor device of the two sensor devices,
the second sensor evaluation unit is connected electrically to the other sensor device of the two sensor devices,
the first sensor evaluation unit and the second sensor evaluation unit are connected electrically to each other, and
the first sensor evaluation unit and the second sensor evaluation unit each have a master function having equal rights.

11. A vehicle comprising:
a door or a flap; and
a device for actuating the door or flap, comprising:
  a mechanism for actuating the door or flap,
  at least two sensor devices spaced from each other, each comprising at least one sensor, and
  a control unit configured to:
    detect a first movement of a person based on signals received from the at least one movement sensor regarding;
    detect a second movement of a person based on signals received from the at least one movement sensor regarding;
    analyze the first and second movements of the person to detect a predefined change in direction between the first and second movements; and
    during a period after the first movement and before the second movement, wirelessly detecting the presence of a key assigned to the vehicle; and
    in response to both (a) detecting the predefined change in direction between the first and second movements of the person and (b) detecting the presence of the key during the period after the first movement and before the second movement, automatically open or close the door or flap of the vehicle.

12. The vehicle according to claim 11, wherein the at least two sensor devices substantially extend in the direction of the width of the vehicle centered at the rear end section of the vehicle, and the at least two sensor devices are aligned substantially parallel to a road surface and pointing towards the road surface.

13. The vehicle according to claim 11, wherein one of the at least two sensor devices runs in a longitudinal direction of the vehicle in front of an opening for a towing hitch of the vehicle, and a further of the at least two sensor devices runs in a longitudinal direction behind the opening for the towing hitch.

14. The vehicle according to claim 11, wherein the at least two sensor devices are integrated into a component of the vehicle mounted to the rear end of the vehicle and substantially consisting of plastic material, such that the at least two sensor devices are embedded in the plastic material such that they are completely protected against an outside area by the plastic material.

15. The vehicle according to claim 11, wherein
the at least two sensors for actuating the flap are arranged at at least one of:
  a bumper of the vehicle,
  at a spoiler of the vehicle,
  at a diffuser of the vehicle, and
  below a rear end of the body of the vehicle.

16. The vehicle according to claim 11, wherein
the at least two sensors for actuating the door are arranged at at least one of: a side skirt of the vehicle and
below a side of the body of the vehicle.

17. The vehicle according to claim 11, wherein
at least one of the sensor devices has an oblong form, and
the at least two sensor devices are arranged substantially parallel to each other.

18. The vehicle according to claim 11, wherein
the control unit comprises a first sensor evaluation unit and at least a second sensor evaluation unit,
the first sensor evaluation unit is connected electrically to one sensor of the at least two sensors,
each of the at least one second sensor evaluation unit is connected electrically to one sensor of the other of the at least two sensors
each of the at least one second sensor evaluation unit is connected electrically to the first sensor evaluation unit, and
the first sensor evaluation unit has a master function and the at least one second sensor evaluation unit has a slave function.

19. The vehicle according to claim 11, wherein
the control unit comprises a first sensor evaluation unit and a second sensor evaluation unit,
the first sensor evaluation unit is connected electrically to one sensor device of the two sensor devices,
the second sensor evaluation unit is connected electrically to the other sensor device of the two sensor devices,
the first sensor evaluation unit and the second sensor evaluation unit are connected electrically to each other, and
the first sensor evaluation unit and the second sensor evaluation unit each have a master function having equal rights.

20. The method according to claim 1, wherein the wireless detection of the presence of the key is initiated in response to the detection of the first movement of the person or the second movement of the person.

21. The device according to claim 7, wherein the wireless detection of the presence of the key is initiated in response to the detection of the first movement of the person or the second movement of the person.

22. The vehicle according to claim 11, wherein the wireless detection of the presence of the key is initiated in response to the detection of the first movement of the person or the second movement of the person.

23. A method for actuating a door or a flap of a vehicle, comprising:
detecting a first movement of a person by at least one movement sensor;
detecting a key assigned to the vehicle;
in response to detecting both (a) the first movement of the person and (b) the key, automatically outputting feedback to the person by at least one of an optical indication and an acoustic indication;
after outputting the feedback to the person, detecting a second movement of the person by the at least one movement sensor;
analyzing the first and second movements of the person to detect a predefined change in direction between the first and second movements; and
if the predefined change in direction between the first and second movements is detected, automatically opening or closing the door or flap of the vehicle.

24. A method for actuating a door or a flap of a vehicle, comprising:

detecting a first movement of a person by at least one movement sensor;

in response to detecting the first movement of the person, automatically outputting feedback to the person by at least one of an optical indication and an acoustic indication;

after detecting the first movement of the person, wirelessly detecting the presence of a key assigned to the vehicle;

in response to detecting the presence of the key, detecting a second movement of the person by the at least one movement sensor;

analyzing the first and second movements of the person to detect a predefined change in direction between the first and second movements; and if the predefined change in direction between the first and second movements is detected, automatically opening or closing the door or flap of the vehicle.

* * * * *